3,347,846
METHOD OF PREPARING 5'-RIBONUCLEOTIDE
Masaharu Yoshikawa, 1155 Nakamaruko, Kawasaki-shi; Koji Kusashio, 29 2-chome, Nishiuraga-machi, Yokoshuka-shi; and Tetsuya Kato, 69–2, Ise-cho, Kawasaki-shi, all of Kanagawa-ken, Japan; and Tadao Takenishi, 13 Tamagawanoge-machi, Setagaya-ku, Tokyo, Japan
No drawing. Filed June 23, 1965, Ser. No. 466,432
Claims priority, application Japan, June 26, 1964, 39/36,029
7 Claims. (Cl. 260—211.5)

The present invention relates to the preparation of 5'-ribonucleotides, and more particularly, to a method of synthesizing 5'-nucleotides from the corresponding nucleosides.

5'-ribonucleotides are useful as seasoning materials, and are also used as pharmaceuticals.

We have found that 5'-ribonucleotides can be obtained rapidly and in very high yields when nucleosides whose 2' and 3' positions are protected are reacted with phosphoryl chloride or tetrachloropyrophosphate in the presence of a trialkyl phosphate.

The basic starting materials of the invention are 2', 3'-O-protected ribonucleosides including purine ribonucleosides, such as adenosine, xanthosine, guanosine, and inosine; pyrimidine ribonucleosides, such as uridine and cytidine; and imidazole ribonucleosides, such as 5-amino-4-carbamoyl-1-β-D-ribofuranosyl imidazole, whose 2' and 3'-positions are protected by acyl radicals of carboxylic acids, such as acetyl or benzoyl radicals, or by alkylidene groups, such as isopropylidene or cyclohexylidene.

The phosphorylating agents which are used in the present invention are phosphoryl chloride and tetrachloropyrophosphate. The phosphorylating agent is preferably used in an amount of more than one mole equivalent per mole of nucleoside.

The trialkyl phosphates which are preferably employed in the method of the invention are triesters of phosphoric acid with aliphatic alcohols, such as trimethyl phosphate, triethyl phosphate, tripropyl phosphate, tri-n-butyl phosphates, tri-i-butyl phosphate and other triphoshates of lower alkanols. Triphosphates of alkanols with more than five carbon atoms are less effective, and the triphosphates of alkanols having more than ten carbon atoms have no measurable effect on the yield or on the reaction rate. The optimum amount of the trialkyl phosphate varies with the amount of phosphorylating agent in the reaction system, and an amount of trialkylphosphate equivalent to the nucleoside is used in the presence of an excess of phosphorylating agent. Conversely, the phosphorylating agent is used in an amount of one mole equivalent per mole of the nucleoside in the presence of an excess of trialkyl phosphate. An excess of both the phosphorylating agent and the trialkyl phosphate may also be used. Trialkyl phosphates whose alcohol component has more than 5 carbon atoms are preferably used in excess because of the lower solubility of 2',3'-O-protected nucleoside in higher alkyl phosphate.

The phosphorylation reaction is preferably carried out at temperatures between −15 and +25° C. The reaction proceeds most readily from −15° C. to +15° C., optimally at about 5° C., when an excess of trialkyl phosphate is used. When an excess of phosphorylating agent is used, a temperature of 0° C. to 25° C. is desirable. A small amount of water may be present in the reaction system. The 2',3'-O-protected nucleoside 5'-phosphorochloridate formed by the phosphorylation is poured into water cooled below 30° C. for hydrolysis of the chloridate. The protecting group of the 2',3' - O - protected nucleoside 5'-phosphate obtained may be split off by conventional methods, for example, by heating in a dilute acidic solution.

The 5'-ribonucleotide obtained may be isolated from the reaction mixture by such conventional methods as evaporation, solvent extraction, or adsorption on ion exchange resin.

The product obtained by the method of the invention consists entirely of the orthophosphate of the corresponding ribonucleoside. Pyrophosphates, polyphosphates, or similar by-products have not been found.

The reaction of the invention proceeds to completion in a very short period.

The following examples are further illustrative of the method of the invention, but it will be understood that the invention is not limited thereto.

*Example 1*

A mixture of 5.0 ml. trimethylphosphate, 0.60 ml. phosphoryl chloride, and 0.92 g. 2',3'-O-isopropylidene uridine was held at −5° C. for 9 hours. 30 ml. ethyl ether were added to the reaction mixture, and the precipitate formed was collected by filtration. The precipitate was dissolved in 10 ml. cool water, the pH of the aqueous solution was adjusted to 1.5 with sodium hydroxide solution, and the solution was heated to 70° C. for 30 minutes to remove the isopropylidene group.

5'-uridylic acid in the hydrolyzate amounted to 1.00 g., for a yield of 95%. The pH of the hydrolyzation solution was adjusted to 8.0 with sodium hydroxide solution, 30 ml., ethanol were added, and 1.13 g. crystalline disodium 5'-uridylate were precipitated (88 percent yield). The disodium 5'-uridylate was recrystallized from water and ethanol.

*Example 2*

1.00 gram 2',3'-O-isopropylidene adenosine was reacted at −15° C. with trimethyl phosphate and phosphoryl chloride as in Example 1. After 4 hours, the reaction mixture was worked up as in Example 1, and 1.00 g. 5'-adenylic acid was found by analysis in the hydrolyzation solution. 1.19 g. disodium 5'-adenylate were recovered, representing a yield of 84%. Pure crystalline disodium 5'-adenylate was obtained by recrystallization from water and ethanol.

*Example 3*

A mixture of 6 ml. trimethyl phosphate, 4.8 ml. phosphoryl chloride, and 2.1 g. 2',3'-O-isopropylidene guanosine was held 20 minutes at 5° C. The yield reached 88 percent.

The reaction mixture was worked up as in Example 1, and the crude crystalline disodium 5'-guanylate recovered weighed 2.5 g., for a yield of 82%.

*Example 4*

A mixture of 10 ml. triethyl phosphate, and 0.72 ml. phosphoryl chloride, and 2.1 g. 2',3'-O-isopropylidene guanosine was held at +15° C. for one hour. The reaction mixture was then poured into 50 ml. ice water, the pH of the solution formed was adjusted to 1.5 with sodium hydroxide, and the solution was heated to 75° C. for 45 minutes in order to remove the isopropylidene group. 2.0 grams 5'-guanylic acid were found in the solution by analysis (85%).

The pH of the hydrolyzation solution was adjusted to 8.0 with sodium hydroxide, the solution was evaporated in a vacuum, and 2.5 g. disodium 5'-guanylate were obtained (80%).

*Example 5*

1.94 grams 5-amino-4-carbamoyl-1-(2',3'-O-isopropylidene)-β-D-ribofuranosyl imidazole were added to a mixture of 10 ml. triethyl phosphate and 0.90 ml. phosphoryl chloride, and the reaction was permitted to proceed at −5° C. for 8 hours.

The reaction mixture was worked up as described in Example 4, and 2.39 g. disodium 5'-monophosphate of 5-amino-4-carbamoyl-1-β-D-ribofuranosyl imidazole were obtained as crude crystals (75%).

Example 6

A mixture of 10 ml. trimethyl phosphate and 3.6 ml. tetrachloropyrophosphate was cooled to −5° C., 1.93 g. 2',3'-O-isobutylidene cytidine were added to the mixture and the same temperature was maintained for 20 hours. The precipitate formed by addition of 50 ml. ethyl ether was isolated by centrifuging, dissolved in 30 ml. ice water, and the pH of the resulting aqueous solution was adjusted to 1.5 to hydrolyze the isobutylidene group. The solution was stored overnight, its pH was then adjusted to 8.0 with sodium hydroxide, and it was evaporated to about 20 milliliters. Ten milliliters ethanol were added to the concentrated solution, and crude crystalline disodium 5'-cytidylate precipitated. It weighed 2.68 g., representing a yield of 82%.

Example 7

2.0 grams 2',3'-O-isobutylidene inosine were added to a mixture of 10 ml. tri-n-butyl phosphate and 1.25 ml. tetrachloropyrophosphate which had been cooled to −5° C., and the reaction proceeded at that temperature for 4 hours.

The reaction mixture was treated as in Example 1, and the amount of 5'-inosinic acid found by analysis corresponded to a yield of 96%. 3.5 g. disodium 5'-inosinate 7.5-hydrate were recovered as crude crystals (88%).

Example 8

2.26 grams 2',3'-O-cyclohexylidene inosine were added to a mixture of 10 ml. phosphoryl chloride and 1.50 ml. trimethyl phosphate which had been cooled to 5° C., and this temperature was maintained for 30 minutes.

The reaction mixture was worked up as in Example 1, and 3.49 g. disodium 5'-inosinate 7.5 hydrate were obtained for a yield of 87%.

Example 9

2.1 grams 2',3'-O-isopropylidene guanosine were reacted with 10 ml. phosphoryl chloride at 5° C. The amount of 2',3'-O-isopropylidene guanylic dichloride in the reaction mixture was determined in samples taken during the reaction at various times, hydrolyzed, and analyzed by paper chromatography. The analysis results were converted to percent yield of 5'-guanylic acid. An otherwise identical reaction was performed in the presence of 1.5 ml. trimethyl phosphate, and the results obtained listed below.

| | Yield of 5'-guanylic acid (percent) after— | | |
|---|---|---|---|
| | 1 hour | 3 hours | 6 hours |
| Without trimethyl phosphate | 6 | 9 | 14 |
| With trimethyl phosphate | 64 | 84 | 87 |

Example 10

Tests analogous to those of Example 9 were carried out with 2.0 g. 2',3'-O-isopropylidene inosine, 10 ml. phosphoryl chloride, and 1.5 ml. tri-n-butyl phosphate with the following results:

| | Yield of 5'-inosinic acid (percent) after— | | | | |
|---|---|---|---|---|---|
| | 0.5 hr. | 1 hr. | 2 hrs. | 3 hrs. | 4 hrs. |
| Without tri-n-butyl phosphate | 9 | 26 | 70 | 81 | 86 |
| With tri-n-butyl phosphate | 71 | 86 | 88 | 89 | 86 |

Analogous results are obtained with nucleosides whose 2',3'-O positions are protected by acyl radicals of carboxylic acids. The acetyl and benzoyl radical are merely typical of such protective acyl radicals.

While the invention has been described with reference to specific embodiments, many modifications and variations are obviously possible in the light of the above teachings. It is therefore to be understood that, within the scope of the appended claims, the invention may be practiced otherwise than as specifically disclosed.

What we claim is:

1. A method of preparing a 2',3'-O-protected 5'-ribonucleotide from a corresponding 2',3'-O-protected nucleoside which comprises reacting said 2',3'-O-protected ribonucleoside with a phosphorylating agent selected from the group consisting of phosphoryl chloride and tetrachloropyrophosphate in the presence of a trialkyl phosphate, and hydrolyzing the 2',3'-O-protected ribonucleoside phosphorodichloridate so formed to the corresponding 2',3'-O-protected-5'-ribonucleotide, the alkyl radicals of said trialkyl phosphate having not more than ten carbon atoms each.

2. A method as set forth in claim 1, wherein the 2'-O and 3'-O positions of said 2',3'-O-protected nucleoside are protected by a radical selected from the group consisting of the isopropylidene, isobutylidene, cyclohexylidine, acetyl, and benzoyl radicals.

3. A method as set forth in claim 1, wherein said 2',3'-O-protected nucleoside is reacted with said phosphorylating agent at a temperature between −15° C. and +25° C.

4. A method as set forth in claim 1, wherein at least one of said phosphorylating agents and of said trialkyl phosphate is reacted in excess with said 2',3'-O-protected ribonucleoside.

5. A method as set forth in claim 1, wherein alkyl radicals of said trialkyl phosphate are radicals of a lower alkanol.

6. A method as set forth in claim 1, wherein said ribonucleoside is selected from the group consisting of uridine, adenosine, guanosine, 5-amino-4-carbamoyl-beta-D-riboduranoyl imidazole, cytidine, inosine, and xanthosine.

7. A method of preparing a 2',3'-O-protected 5'-ribonucleotide which comprises reacting a 2',3'-O-protected ribonucleoside selected from the group consisting of uridine, adenosine, guanosine, 5-amino-4-carbamoyl-beta-D-ribonduranoyl imidazole, cytidine, inosine, and xanthosine, and having a protective radical selected from the group consisting of the isopropylidene, isobutylidene, cyclohexylidene, acetyl, and benzoyl radicals, at a temperature between −15° C. and +25° C. with a phosphorylating agent selected from the group consisting of phosphoryl chloride and tetrachloropyrophosphate and with a tri-lower-alkyl phosphate, at least one of said phosphorylating agents and said tri-lower-alkyl phosphate being in excess over said ribonucleoside; and hydrolyzing the corresponding 2',3'-O-protected ribonucleoside phosphorodichloridate so formed to the corresponding 2',3'-O-protected ribonucleotide in an acidic aqueous medium at a temperature not higher than 30° C.

References Cited

UNITED STATES PATENTS

| 3,201,389 | 8/1965 | Fujimoto et al. | 260—211.5 |
| 3,282,920 | 11/1966 | Ouchi et al. | 260—211.5 |
| 3,288,780 | 11/1966 | Tsuchiya et al. | 260—211.5 |

LEWIS GOTTS, *Primary Examiner.*

J. R. BROWN, *Assistant Examiner.*